Feb. 18, 1958 S. K. ANDERSEN 2,823,760
WATER SEPARATOR
Filed May 10, 1955
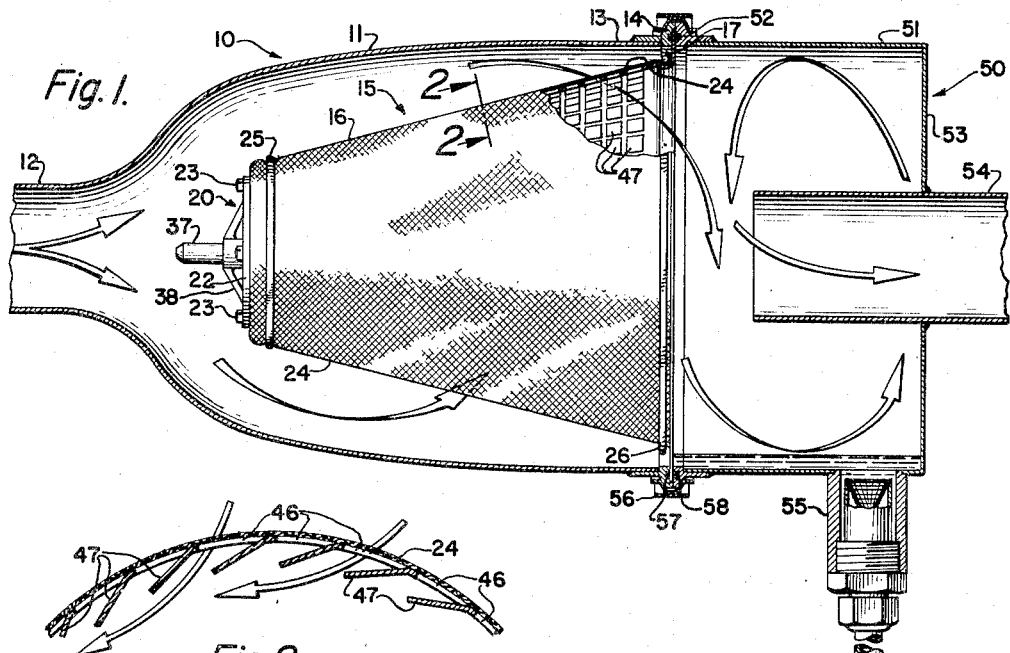
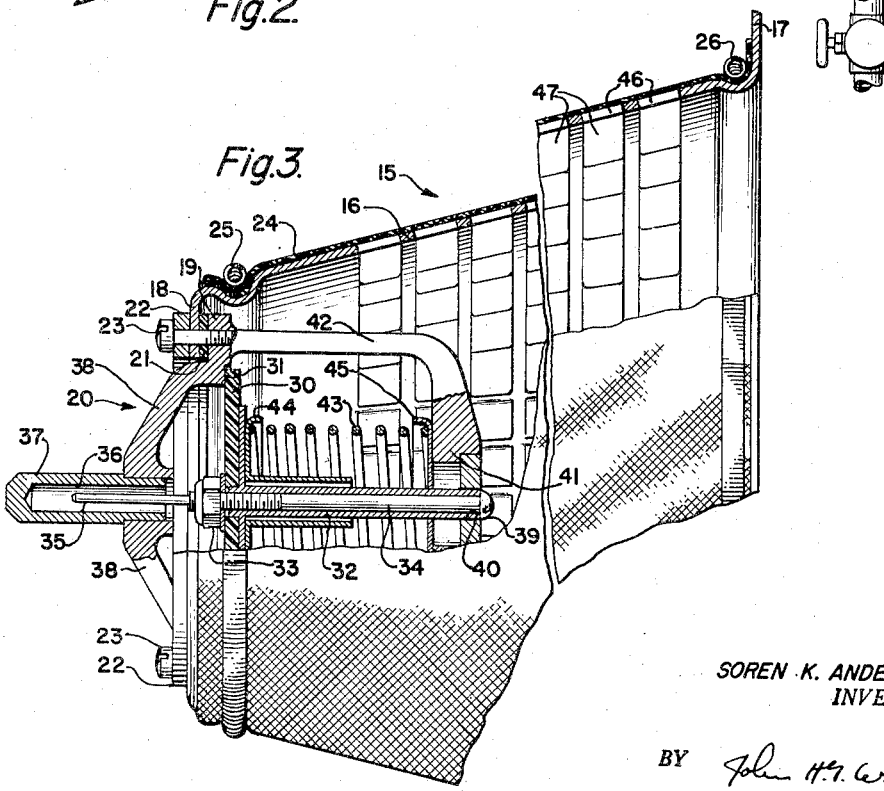
SOREN K. ANDERSEN,
INVENTOR.
BY John H. Wallace

United States Patent Office 2,823,760
Patented Feb. 18, 1958

2,823,760

WATER SEPARATOR

Soren K. Andersen, Los Angeles, Calif., assignor to The Garrett Corporation, Los Angeles, Calif., a corporation of California Application May 10, 1955, Serial No. 507,228

7 Claims. (Cl. 183—39)

This invention relates generally to apparatus for separating liquids from gases or gaseous fluids and, more particularly, to apparatus for removing particles of a liquid such as water from a gaseous fluid such as air.

The invention has particular utility in air conditioning systems such as those employed for conditioning the air delivered to aircraft cabins and the like. However, it is to be understood that its utility is not limited to such systems since many other applications are possible, as will be apparent to those skilled in the art.

Heretofore, apparatus employed to remove moisture from air delivered to the aircraft cabins has been unduly heavy, and the heavy weight of the prior apparatus acted as a parasitic handicap. For example, it has been estimated that for each pound of weight added on the aircraft by an accessory, the over-all weight of the airplane must be increased approximately 7 pounds due to increased power requirements, wing area, space accommodation, etc. Accordingly, it is desirable to reduce the weight of aircraft equipment and accessories to as low a figure as possible.

The heavy weight of prior water separators has been due largely to the many complex and heavy components used in the separator. It is an object of the present invention to utilize lighter, thinner and smaller components to produce a small, lightweight and efficient water separator.

It is another object of the invention to provide a novel combination of elements in a water separator to provide efficient removal of moisture with a minimum of pressure drop across the separator.

It is a further object of the invention to provide a novel condenser for a water separator.

It is a still further object of the invention to provide novel lightweight mounting means for the elements of a water separator.

Other and further objects of the invention will become apparent from the disclosures in the following detailed specification, appended claims, and accompanying drawing, wherein:

Figure 1 is a sectional view through the separator of the present invention;

Figure 2 is an enlarged fragmentary sectional view through a portion of the condenser showing details of the swirl vanes, taken substantially as indicated by line 2—2, Figure 1; and Figure 3 is an enlarged fragmentary sectional view showing the mounting arrangement for a condenser material and the pressure responsive by-pass valve as utilized in connection with the condenser of the present invention.

With reference to the drawing, a water separator embodying the present invention is shown as indicated generally at 10. The separator is adapted to be installed in a conduit having a stream of gas, such as air, from which entrained liquid particles, such as water, are to be removed and includes a generally conical contoured sheet metal housing 11 which, together with a cylindrical portion 12, forms an inlet for the moisture-laden gases. The housing 11 is also provided, on its larger end, with a cylindrical portion 13 that, in turn, is fitted with a radially outwardly extending flange 14.

A condenser, indicated generally at 15, is positioned within the housing 11. The condenser 15 includes a conical body portion 16, the larger end of which is provided with a radially outwardly extending flange 17 that is positioned adjacent the flange 14 on the housing 11. The cone of the condenser body portion 16 is more obtuse than the cone of the housing 11. The condenser is thus positioned in spaced relationship to the inner surface of the housing 11 with the smaller end of the condenser being a greater distance from the housing 11 than the larger end thereof.

As shown primarily in Figure 3, the smaller end of the body portion 16 of the condenser 15 has a radially inwardly directed annular flange 18 disposed on a ring 19 of a pressure responsive by-pass valve indicated generally at 20. A gasket 21 is disposed between the ring 19 and the flange 18. The ring 19, the flange 18, and an external washer 22 are clamped together by means of a plurality of screws 23 that extend through these members and threadably engage the ring 19.

The outer surface of the body portion 16 is covered with a layer of porous material 24 such as, for example, a fibreglass cloth, the material being maintained in position by means of annular spring members 25 and 26. The smaller end of the porous material 24 is folded over beneath itself and beneath the spring member 25.

With further reference to Figure 3, the pressure responsive by-pass valve 20 further includes a valve member 30 that is adapted for cooperation with an annular valve seat 31 formed on the inner periphery of the ring 19. The valve member 30 is mounted and secured on an elongated spacer member 32 by means of a nut 33 which threadably engages a shaft 34. The shaft 34 has at one end a reduced diameter outwardly extending portion 35 that is slidably positioned and guided in a bore 36 in a guide member 37. A plurality of radially extending struts 38 formed integrally with and depended from the outer surface of the ring 19 are utilized to fixedly support the guide member 37. The shaft 34 is provided at its other end with a head 39 that engages the elongated spacer member 32. The shaft 34 and the spacer member 32 are free to move axially through an opening 40 provided in an enlarged central portion 41 of a web 42 that is formed integral with and depends from the inner surface of the ring 19.

A compression spring 43 is disposed between a retainer 44 that engages the reciprocating valve member 30, and a retainer 45 that contacts the fixed enlarged central portion 41 of the web 42, and constitutes a portion of a by-pass that permits the moisture-laden gas to by-pass the condenser when the pressure differential across the valve member 30 exceeds the force of the compression spring 43.

With reference primarily to Figures 1 and 2, the body portion 16 of the condenser 15 has its entire area provided with a plurality of U-shaped ventholes or perforations 46. The material contained within the confines of these U-shaped perforations is bent inwardly, as shown in Figure 2, and contoured to form a plurality of inwardly disposed swirl vanes 47, the purpose of which will be hereinafter described.

A generally cylindrical centrifugal collector, indicated generally at 50, is disposed downstream from the condenser 15. The collector 50 includes an annular cylindrical wall 51, one end of which is provided with a flange 52 that is disposed in contact with the flange 17 of the body portion 16. The outer end of the wall 51 is bent downwardly to form a radially extending end wall 53. A tube or conduit 54 that serves as a dry gas outlet from the separator is axially mounted on, and extends within the centrifugal collector 50.

The collector 50 is provided with a valved drain 55 to enable removal of the collected liquid. This particular arrangement permits the separator to be rotated for installation in any desired position by a simple change in the location and direction of the drain 55. Additionally, the drain 55 may be mounted in the end wall 53, thereby permitting the present separator to be used vertically, instead of horizontally as shown.

A simple connecting means is provided for assembling the various components of the present separator. This means includes a clamp ring 56 that encircles the abutting flanges 14, 17 and 52 in such a manner as to urge and hold these components into tight engagement. If desired, a pair of sealing rings 57 and 58 may be disposed in grooves in radial surfaces of the flanges 14 and 52, respectively.

In operation, moisture-laden gas, such as air, is conducted into the separator by way of the cylindrical portion 12 of the housing 11. The air thereafter flows into the space defined between the outer surface of the condenser 15 and the inner surface of the housing 11 in paths lying in planes including the axis of the housing. The difference in the conical configurations of the condenser 15 and the housing 11 serves to maintain constant effective pressure along the entire surface of the condenser 15. The moisture-laden air thereafter passes through the porous cloth material 24, wherein the fog and exceedingly small droplets of entrained moisture is condensed or coalesced into water droplets which are subsequently blown from the material. As the air and water droplets pass between the contoured swirl vanes 47 a helical swirl is imparted to the fluid mass and the flow of the fluid is changed from a flow lying in planes including the axis of the housing to a generally helical or swirling flow. The swirling mass thereafter passes into the centrifugal collector 50 where, by centrifugal action, the heavier water droplets are thrown to the radially outer area of the collector 50 and thereafter gravitate from the walls 51 and 53 to the lower portion of the collector. The collection of the water droplets may be drained from the collector by means of the valved drain 55. The dried air separated from the water droplets passes outwardly from the separator through the outlet tube 54.

In the event that the flow through the material 24 is impaired or impeded, such as may occur when ice forms on the material, the pressure of the incoming air, acting on the upstream side of the valve member 30, will increase until the force of this pressure overcomes the combined force of the compression spring 43 and the pressure of the air acting on the downstream side of the valve member and moves the valve member from the valve seat 31. The moisture-laden gas will then flow past the valve member 30 and through the interior of the condenser 15 to the outlet conduit 54.

Thus, it may be seen that flow of gas through the present device entails a minimum of pressure loss. Because of the simplicity of the device the utilization of a minimum of small, lightweight components permits an efficient separator that is extremely light in weight and relatively inexpensive to manufacture.

Having thus described the invention and the present embodiment thereof, it is desired to emphasize the fact that modifications may be resorted to in a manner limited only by a just interpretation of the following claims.

I claim:

1. In apparatus for removing particles of liquid entrained in a stream of gaseous fluid, the combination of: a generally conically shaped housing adapted to be disposed in a fluid line, said housing having an inlet at one end for the moisture-laden fluid; a condenser within said housing, said condenser including a conically shaped mesh wall having inwardly directed swirl vanes formed thereon, the smaller end of said conically shaped mesh wall being positioned upstream and spaced a greater distance from said housing than the larger end thereof so as to define an annular channel decreasing in cross-sectional area toward the downstream end of said condenser; a radially outwardly disposed annular mounting flange on the larger end of said conical condenser wall; a fiberglass cloth disposed about the outer surface of said conical condenser wall; clamp means for maintaining said cloth in position; a cylindrical centrifugal collector section disposed downstream from said condenser; means associated with said condenser mounting flange for securing said housing, condenser and collector sections in respective positions; a dry fluid outlet passage mounted in an end wall of said collector section and extending into the cylindrical portion thereof in axial alignment with said housing inlet; and drain means for removal of moisture from said collector section.

2. In apparatus for removing particles of liquid entrained in a stream of gaseous fluid, the combination of: a generally conically shaped housing adapted to be disposed in a fluid line, said housing having an inlet at one end for the moisture-laden fluid; a condenser within said housing, said condenser including a conically shaped mesh wall having inwardly directed swirl vanes formed thereon, the smaller end of said conically shaped mesh wall being positioned upstream and spaced a greater distance from said housing than the larger end thereof, so as to define an annular channel decreasing in cross-sectional area toward the downstream end of said condenser; a radially outwardly disposed annular mounting flange on the larger end of said conical condenser wall; a fiberglass cloth disposed about the outer surface of said conical condenser wall; clamp means for maintaining said cloth in position; a cylindrical centrifugal collector section disposed downstream from said condenser; means associated with said condenser mounting flange for securing said housing, condenser and collector sections in respective positions; a dry fluid outlet passage mounted in an end wall of said collector section and extending into the cylindrical portion thereof in axial alignment with said housing inlet; drain means for removal of moisture from said collector section; and a pressure responsive by-pass valve positioned in the smaller end of the conical wall of said condenser.

3. In apparatus for removing particles of liquid entrained in a stream of gaseous fluid, the combination of: a housing adapted to be disposed in a fluid line in axial alignment therewith, said housing having an inlet located centrally in one end thereof for admitting the moisture-laden fluid into said housing in paths lying in planes including the axis of said housing; a condenser mounted within said housing in co-axial alignment with said inlet and having a wall spaced from an inner surface of said housing, said wall containing a plurality of perforations having configurations adapted to impart a swirling motion to fluid passing through said perforations and change the flow of said fluid from a flow lying in planes including the axis of said housing to a generally helical flow; a layer of porous material disposed on said condenser; a collector disposed downstream from said condenser; means for removing moisture collected in said collector; and a dry fluid outlet passage from said collector.

4. In apparatus for removing particles of liquid entrained in a stream of gaseous fluid, the combination of: a generally cylindrically shaped housing adapted to be disposed in a fluid line in axial alignment therewith, said housing having an inlet duct located centrally in one end for admitting the moisture-laden fluid into said housing in paths lying in planes including the axis of said housing; a generally conically shaped condenser mounted within said housing in co-axial alignment with said inlet duct and having a wall spaced from an inner surface of said housing, said wall containing a plurality of perforations having configurations formed to impart a swirling motion to fluid passing through said perforations and change the flow of said fluid from a flow lying in planes including the axis of said housing to a generally helical flow; a layer of porous material disposed on said wall; a generally cylindrically shaped centrifugal collector disposed downstream from said condenser and adapted for reception of moisture droplets from said condenser, said collector having moisture drainage means and a dry fluid outlet passage, the collector and the outlet passage being disposed co-axially with respect to the condenser and the inlet duct.

5. In apparatus for removing particles of liquid entrained in a stream of gaseous fluid, the combination of: a generally cylindrically shaped housing adapted to be disposed in a fluid line in axial alignment therewith, said housing having an inlet duct located centrally in one end for admitting the moisture-laden fluid into said housing in paths lying in planes including the axis of said housing; a generally conically shaped condenser mounted within said housing in co-axial alignment with said inlet duct, said condenser including a wall containing a plurality of perforations having configurations formed to impart a swirling motion to fluid passing through said perforations and change the flow of said fluid from a flow lying in planes including the axis of said housing to a generally helical flow, the wall of said condenser being positioned with respect to the inner wall of said housing so as to define an annular channel decreasing in cross-sectional area toward the downstream end of said condenser; a layer of porous material disposed on the outer surface of said condenser wall; a generally cylindrically shaped centrifugal collector section secured to said housing and disposed downstream from said condenser, said collector having moisture drainage means and a dry fluid outlet passage centrally mounted in an end wall and extending into the cylindrical portion thereof, the collector and the outlet passage being disposed co-axially with respect to the condenser and the inlet duct.

6. In apparatus for removing particles of liquid entrained in a stream of gaseous fluid, the combination of: a generally cylindrically shaped housing adapted to be disposed in a fluid line in axial alignment therewith, said housing having an inlet duct located centrally in one end for admitting the moisture-laden fluid into said housing in paths lying in planes including the axis of said housing; a condenser mounted within said housing in co-axial alignment with said inlet duct, said condenser including a conical wall containing a plurality of perforations having configurations formed to impart a swirling motion to fluid passing through said perforations and change the flow of said fluid from a flow lying in planes including the axis of said housing to a generally helical flow, the smaller end of said conical wall being positioned upstream and spaced a greater distance from said housing than the larger end thereof so as to define an annular channel decreasing in cross-sectional area toward the downstream end of said condenser; a layer of porous material disposed on the outer surface of said conical wall; a generally cylindrically shaped centrifugal collector section secured to said housing and disposed downstream from said condenser, said collector having moisture drainage means and a dry fluid outlet passage centrally mounted in an end wall and extending into the cylindrical portion thereof, said collector and said outlet passage being disposed co-axially with respect to said condenser and said inlet duct; and a pressure responsive by-pass valve co-axially mounted in said condenser to permit fluid to flow directly and generally in a straight line from said inlet duct to said outlet passage when the pressure of the moisture-laden fluid exceeds a predetermined pressure.

7. In apparatus for removing particles of liquid entrained in a stream of gaseous fluid, the combination of: a generally cylindrically shaped housing having a centrally located inlet duct at one end for admitting the moisture-laden fluid; a condenser in said housing having a longitudinal axis aligned with the axis of said inlet duct, said condenser having a wall spaced from an inner surface of said housing and having a plurality of perforations having configurtions adapted to impart a swirling motion to fluid passing through said perforations and change the flow of said fluid from a flow lying in planes including the axis of said housing to a generally helical flow.; a centrifugal collector disposed downstream from said condenser and having means for removing moisture collected in said collector and a dry outlet passage, said collector and said outlet passage being disposed co-axially with respect to said condenser and said inlet duct; and a pressure responsive by-pass valve co-axially mounted in said condenser to permit fluid to flow directly and generally in a straight line from said inlet duct to said outlet passage when the pressure of the moisture-laden fluid exceeds a predetermined pressure.

References Cited in the file of this patent

UNITED STATES PATENTS

| 1,099,773 | Smith | June 9, 1914 |
| 1,544,950 | Smith | July 7, 1925 |
| 1,702,804 | Winslow | Feb. 19, 1929 |
| 1,864,201 | Kegerreis et al. | June 21, 1932 |
| 2,117,718 | Hawley | May 17, 1938 |
| 2,170,074 | Hewitt | Aug. 22, 1939 |
| 2,661,076 | Walker | Dec. 1, 1953 |
| 2,687,782 | Sonderegger | Aug. 31, 1954 |

FOREIGN PATENTS

| 168,129 | Switzerland | June 1, 1934 |